United States Patent [19]

Kosikowski et al.

[11] 4,133,895

[45] Jan. 9, 1979

[54] PREPARATION OF BLUE CHEESE FLAVOR

[75] Inventors: Frank V. Kosikowski, Ithaca, N.Y.; Ramesh C. Jolly, Groton, Conn.

[73] Assignee: Cornell Research Foundation, Inc., Ithaca, N.Y.

[21] Appl. No.: 504,714

[22] Filed: Sep. 10, 1974

[51] Int. Cl.$^2$ .................. A23C 9/12; A23C 21/00; A23C 23/00

[52] U.S. Cl. .................. 426/33; 426/35; 426/41; 426/42; 426/491; 426/650

[58] Field of Search ............ 426/33, 34, 35, 37, 426/42, 43, 491, 650

[56] References Cited

U.S. PATENT DOCUMENTS

| | | | |
|---|---|---|---|
| 3,072,488 | 1/1963 | Watts, Jr. et al. | 426/34 |
| 3,100,153 | 8/1963 | Knight | 426/35 |

OTHER PUBLICATIONS

Kosikowski, F. V., Cheesemaking by Ulrafiltration, J. Da. Sci., vol. 57, Apr. 1974 (pp. 488–491).

*Primary Examiner*—David M. Naff
*Attorney, Agent, or Firm*—Lawrence E. Laubscher; Ralph R. Barnard; Theodore C. Wood

[57] ABSTRACT

Blue cheese flavored products are produced by forming a mixture of whey, food fat, salt and water, homogenizing and pasteurizing the mixture, adding lipase and *Penicillium roqueforti* spores to the mixture and fermenting. Alternatively, a mixture of food fat, salt and water is pasteurized and fermented with lipase and *Penicillium roqueforti* spores, and the resultant fermented mixture is mixed with a retentate produced by ultrafiltration of a milk product. The blue cheese flavored products have an extremely high quotient of flavor which can be blended with other foods to impart a blue cheese flavor.

6 Claims, No Drawings

PREPARATION OF BLUE CHEESE FLAVOR

The present invention is concerned with a method for producing a concentrated blue cheese flavor product. More particularly, the invention is concerned with the production of a blue cheese flavor in specific media by the interaction of enzymes and mold spores.

The popularity of food products flavored with blue cheese, one of the more improtant mold ripened cheeses, has been increasing. Blue cheese flavoring is used in a variety of food products including snacks, dips, dressing, etc. Ideally the blue cheese flavoring should be in a highly concentrated form such that only a small amount need be added to the food product to provide the required flavoring strength.

Typically, blue cheese requires about 90 days for fermentation or ripening. During this ripening, spores of Penicillium blue mold species, i.e. *Penicillium roqueforti*, convert the liberated free fatty acids derived from butterfat to methyl ketones with one less carbon atom. Attempts have been made to produce blue cheese flavor by submerged fermentation of *P. roqueforti* spores without the cheese, and blue cheese flavor has also been produced by fermentation using a media of homogenized milk and lyophilized milk fat. The disadvantages of such methods include the extensive amount of time required for the ripening process and also the relatively expensive ingredients used in producing the blue cheese flavor. Furthermore, the blue cheese flavor product does not have the high quotient of flavor desirable for blending with other food products.

An object of the present invention is an improved method for producing blue cheese flavor both at lower cost and at a faster rate.

A further object of the invention is to produce a blue cheese flavor product having a higher quotient of flavor than has been previously possible.

Briefly, in accordance with one embodiment of the present invention, a blue cheese flavor product is produced by first forming a mixture of whey, food fat, salt and water which is first homogenized and then pasteurized. Effective amounts of a lipase, either microbial or animal, and spores of a Penicillium blue mold species, preferably *P. roqueforti*, are then added to the mixture which is then fermented to form the flavor product.

The relative proportions per 100 grams of the components of the mixture is as follows:
whey — about 5–20 grams,
food fat — about 3–20 grams,
salt — about 0–3 grams,
lipase — about 4–10 mg.,
spores of Penicillium blue mold species — about 10–20 mg., and
the balance being water.

The whey which serves as a substrate in place of the milk or cream substrates of the prior art may be either of the sweet or acid variety. Whey is a much cheaper substrate, it often being considered a waste product. Thus, in accordance with the present method utilizing whey, there is a substantial cost saving.

The food fat may be butterfat, coconut oil or other vegetable fat; and the salt, if present, is commonly sodium chloride.

The pasteurization step is carried out at a temperature of at least 161° F. for a period of at least 16 seconds. Following the pasteurizing step and before the lipase and spores are added, the pasteurized mixture is cooled to about room temperature.

The preferred species of the Penicillium blue mold species is *Penicillium roqueforti*, although other Penicillium blue mold spores may also be used.

During fermentation of the mixture, the lipase enzyme ensures the generation of free fatty acids and methyl ketones. These are the major compounds responsible for the blue cheese flavor. Of the methyl ketones, heptanone is the primary ketone responsible for flavor.

During the fermentation process, oxygen may be advantageously injected into the mixture at the rate of about 100–600 ml. per liter of the mixture per minute. This serves to accelerate the fermentation process.

The fermentation process is carried out at room temperature for a period of only about 48 to 72 hours. This is a substantial improvement over prior art processes for producing blue cheese requiring up to 90 days.

Conveniently, the product produced following fermentation may be concentrated to about 20–96% solids, the latter being a powder, having a high quotient of flavor for blending with other foods to impart a blue cheese flavor.

In a further embodiment of the present invention a mixture of food fat, salt and water is pasteurized after which effective amounts of either microbial lipase or animal lipase and of spores of a Penicillium blue mold species are added. This mixture is then fermented under the same conditions described for the fermentation step in the first embodiment. The fermented mixture is then mixed with a retentate having about 5–25% protein by weight and produced by ultrafiltration of a milk product to form a resultant mixture having a fat content of about 5–40% by weight. This resultant mixture is then pasteurized to form the flavor product which may be concentrated and dried to powder form in the same manner as in the first embodiment, or used intact.

In the second embodiment the relative proportions per 100 grams of the components of the mixture are as follows:
food fat — about 10–40 grams,
salt — about 0–3 grams,
lipase — about 5–10 mg.,
spores of Penicillium blue mold species — about 50–70 mg., and
the balance water.

The selective concentration of a milk product by ultrafiltration is now well known in the art. The process is described in detail in an article entitled "Cheesemaking by Ultrafiltration" by Frank V. Kosikowski, *Journal of Dairy Science*, Vol. 57, April 1974, pages 488–491, which is incorporated by reference in its entirety as are also the publication references cited in the article, all of which are concerned with ultrafiltration of milk products. The milk product retentate used in the present method is produced by the ultrafiltration of whey, skim milk, whole milk or mixtures thereof.

Both of the disclosed embodiments lend themselves to a continuous production process for producing the cheese flavor product. Thus, spores, lipase and food fat may be continuously added to the mixture while blue cheese flavor compounds are continuously removed. Furthermore, by utilizing an aeration rate higher than 1200–1400 ml. per liter of the medium per minute, flavor compounds responsible for blue cheese flavor can be stripped from the mixture and can be absorbed into a medium like milk, skim milk, sweet whey, acid whey or a mixture of sweet and acid whey, cream, etc.

As stated earlier, the liberated fatty acids and methyl ketones are the major constituents of the blue cheese flavor. Table 1 sets forth the total carbonyl, monocarbonyl and methyl ketones in blue cheese flavor powders produced in the manner described above wherein both acid whey and sweet whey were utilized as the substrate:

TABLE 1.

| Sample | Total carbonyl | Mono-carbonyl | Methyl ketones |
|---|---|---|---|
| | u moles/10 g dry powder | | |
| Flavor Powder from Acid Whey | 351.11 | 322.22 | 298.74 |
| Flavor Powder from Sweet Whey | 138.89 | 133.33 | 93.33 |

Also as stated earlier the methyl ketones are the primary source of the blue cheese flavor. Table II shows a breakdown for the individual methyl ketones in blue cheese flavor powders produced in accordance with the above described method.

TABLE II.

| Chain length of Methyl ketone | From acid whey | | From sweet whey | |
|---|---|---|---|---|
| | Per 10 g of powder | Per g fat | Per 10 g of powder | Per g fat |
| | u moles | | u moles | |
| $C_3$ | 10.06 | 5.29 | 1.96 | .83 |
| $C_5$ | 41.51 | 19.42 | 17.62 | 7.42 |
| $C_7$ | 122.64 | 57.39 | 30.02 | 12.64 |
| $C_9$ | 51.89 | 24.28 | 22.19 | 9.34 |
| $C_{11}$ | 34.91 | 16.34 | 15.66 | 6.59 |
| $C_{13}$ | 22.64 | 10.59 | 5.87 | 2.47 |
| $C_{15}$ | 15.09 | 7.09 | — | — |

Table III illustrates the general composition of the blue cheese flavor powders produced by the above described method.

TABLE III.

| | From acid whey | From sweet whey |
|---|---|---|
| Moisture (% by weight) | 8.0 | 7.3 |
| Fat (% by weight) | 21.4 | 23.8 |
| Protein (% by weight) | 8.4 | 9.7 |
| Product pH | 4.6 | 4.8 |
| Free Volatile fatty acids as 0.1N NaOH/10 gm of product | 127.0 | 115.8 |

It will be appreciated that in accordance with the above described method an improved blue cheese flavor product is produced having a substantially greater concentration of blue cheese flavor compounds than has been possible with prior art methods. Furthermore, due to the substantially shorter time required for fermentation, the overall production time is also substantially reduced. By utilizing whey, a waste product, in place of other commonly used substrates, the blue cheese flavor product can be produced at considerably lower cost. The fermentation process itself is simplified in terms of temperature control and pH control. The fermentation is normally carried out at room temperature and the pH is not critical, and as a matter of fact acid whey is a desirable substrate. By utilizing typical lipase enzymes, the addition of lipolyzed fat is eliminated, and highly desirable free fatty acids are produced which act as precursors for the production of methyl ketones responsible for the blue cheese flavor. Finally, the use of powder as a carrier for blue cheese flavor offers a more convenient means for flavoring foods as compared to liquid flavors.

The process has been described for purposes of illustration only. Other embodiments of the disclosed process are possible without departing from the spirit of the invention.

What is claimed is:

1. A method for producing a product having a blue cheese flavor comprising the following steps in recited sequence
    (a) forming a mixture comprising food fat, sodium chloride and water,
    (b) pasteurizing said mixture,
    (c) adding an effective amount of at least one lipase selected from the group consisting of microbial lipase and animal lipase and an effective amount of *Penicillium roqueforti* to said mixture, the relative proportions per 100 grams of said components of said mixture being
    food fat — about 10–40 grams
    sodium chloride — about 0–3 grams
    lipase — about 5–10 mg.
    spores of *Penicillium roqueforti* — about 50–70 mg.; and
    the balance being water, (d) fermenting said mixture at about room temperature for a period of about 48 to 72 hours,
    (e) selectively concentrating by ultrafiltration a milk product selected from the group consisting of whey, skim milk and whole milk to produce a retentate having about 5–25% protein by weight of the retentate;
    (f) mixing the fermented mixture with the ultrafiltration retentate to produce a resultant mixture having a fat content of from about 5–40%, and
    (g) pasteurizing the resultant mixture to form said flavor product.

2. A method according to claim 1 including the further step of concentrating the resulting mixture to about 20–96% solids.

3. A method according to claim 1 wherein said whey is selected from the group consisting of sweet and acid wheys.

4. A method according to claim 1 wherein said food fat is selected from the group consisting of butterfat and coconut oil.

5. A method according to claim 1 wherein both said pasteurizing steps are carried out at a temperature of at least 161° F. for a period of at least 16 seconds.

6. A method according to claim 1 wherein said mixture is cooled to room temperature after said pasteurizing step and before said lipase and spores of *Penicillium roqueforti* are added.

* * * * *